US012749743B2

(12) United States Patent
He

(10) Patent No.: US 12,749,743 B2
(45) Date of Patent: Sep. 29, 2026

(54) BUTTON CELL

(71) Applicant: NINGDE AMPEREX TECHNOLOGY LIMITED, Ningde City (CN)

(72) Inventor: Bangbang He, Ningde City (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 790 days.

(21) Appl. No.: 18/128,371

(22) Filed: Mar. 30, 2023

(65) Prior Publication Data

US 2023/0238617 A1 Jul. 27, 2023

Related U.S. Application Data

(63) Continuation of application No. PCT/CN2021/106314, filed on Jul. 14, 2021.

(30) Foreign Application Priority Data

Dec. 25, 2020 (CN) ........................ 202011566819.6

(51) Int. Cl.

*H01M 50/109* (2021.01)
*H01M 10/0585* (2010.01)

(Continued)

(52) U.S. Cl.

CPC ..... *H01M 50/109* (2021.01); *H01M 10/0585* (2013.01); *H01M 50/153* (2021.01); *H01M 50/181* (2021.01); *H01M 50/184* (2021.01)

(58) Field of Classification Search

None

See application file for complete search history.

(56) References Cited

U.S. PATENT DOCUMENTS

2007/0117011 A1 5/2007 Myerberg et al.
2020/0365835 A1 11/2020 Jiang et al.

FOREIGN PATENT DOCUMENTS

CN 201233915 Y 5/2009
CN 108023037 A 5/2018

(Continued)

OTHER PUBLICATIONS

Yu et al, CN 211605201 U, English Translation from FIT, 7 pages (Year: 2020).*

(Continued)

*Primary Examiner* — Colin W. Slifka
(74) *Attorney, Agent, or Firm* — WHDA, LLP

(57) ABSTRACT

A button cell includes a packaging member and an electrode assembly. The packaging member includes an insulating wall, a first end cover, and a second end cover. The insulating wall is provided with a through accommodating cavity, and the first end cover and the second end cover are arranged at two ends of the accommodating cavity, respectively. The insulating wall is further provided with a first communication hole for communication between the accommodating cavity and an external environment of the packaging member. The electrode assembly is accommodated in the accommodating cavity and includes a first electrode plate and a second electrode. The packaging member further includes a first conductive terminal arranged at the first communication hole, which is electrically connected to the first electrode plate forming an outer tab of the button cell, and is arranged on a wall instead of an end cover.

12 Claims, 3 Drawing Sheets

(51) Int. Cl.

| | |
|---|---|
| ***H01M 50/153*** | (2021.01) |
| ***H01M 50/181*** | (2021.01) |
| ***H01M 50/184*** | (2021.01) |

(56) References Cited

FOREIGN PATENT DOCUMENTS

| | | | |
|---|---|---|---|
| CN | 111244381 | A | 6/2020 |
| CN | 111276643 | A | 6/2020 |
| CN | 111403632 | A | 7/2020 |
| CN | 211045533 | U | 7/2020 |
| CN | 211088318 | U | 7/2020 |
| CN | 111584770 | A | 8/2020 |
| CN | 111613739 | A | 9/2020 |
| CN | 111682130 | A | 9/2020 |
| CN | 111725552 | A | 9/2020 |
| CN | 211605201 | U | 9/2020 |
| CN | 211700342 | U | 10/2020 |
| CN | 112687994 | A | 4/2021 |

OTHER PUBLICATIONS

International Search Report dated Oct. 14, 2021, issued in counterpart International Application No. PCT/CN2021/106314.
Notice of Allowance dated Jun. 15, 2022, issued in counterpart ChinesePatent Application No. 202011566819.6.
The Partial Extended (Supplementary) Eiropean Search Report dated Sep. 17, 2024, issued in counterpart EP Application No. EP21908557. (2 pages).

* cited by examiner

BUTTON CELL

CROSS REFERENCE TO THE RELATED APPLICATIONS

This application is a continuation under 35 U.S.C. § 120 of international patent application PCT/CN2021/106314 filed on Jul. 14, 2021, and the international patent application PCT/CN2021/106314 claims priority to Chinese Patent Application No. 202011566819.6 filed on Dec. 25, 2020, the entire contents of which are incorporated herein by reference.

TECHNICAL FIELD

This application relate to the technical field of batteries, and in particular, to a button cell.

BACKGROUND

A button cell, also called button type cell, has the shape of a button. Due to their small size, portability, stable discharge voltage, and other advantages, button cells have been widely used in electronic devices.

Generally, a button cell includes a packaging member and an electrode assembly accommodated in the packaging member. The electrode assembly is wound into a cylindrical structure, including a first electrode plate, a separator, a second electrode plate having a polarity opposite to that of the first electrode plate, and another separator and cyclically other such electrode plates and separators arranged in this order. The packaging member includes a wall in a tubular shape, and end covers arranged at two ends of the wall, respectively; the first electrode plate is electrically connected to one end cover, and the second electrode plate is electrically connected to the other end cover. That is, the end covers themselves form outer tabs of the button cell.

Inventors of this application have found in the implementation of this application that there are only a few types of button cells on the market. After being mounted to an electronic device, a button cell is electrically connected to external components thereof through its two end covers, so corresponding conductive terminals need to be arranged in the electronic device at portions corresponding to the end covers. In some application scenarios, portions of an electronic device corresponding to the end covers have a complex structure, making it inconvenient to arrange conductive terminals at portions corresponding to the two end covers. On the contrary, this electronic device allows conductive terminals to be easily arranged at portions corresponding to the wall, but there are currently no button cells having a tab on a wall to adapt to these scenarios.

SUMMARY

Embodiments of this application are intended to provide a button cell to overcome the current lack of button cells having a tab on a wall.

The following technical solution is employed in the embodiments of this application to solve its technical problems. The solution is specifically as follows.

A button cell includes a packaging member and an electrode assembly. The packaging member includes a first end cover, a second end cover, and an insulating wall, where the insulating wall encloses an accommodating cavity, the first end cover covers a first end of the accommodating cavity, and the second end cover covers a second end of the accommodating cavity. The insulating wall is further provided with a first communication hole for communication between the accommodating cavity and an external environment of the packaging member. The electrode assembly is accommodated in the accommodating cavity and includes a first electrode plate and a second electrode that have opposite polarities. The packaging member further includes a first conductive terminal arranged at the first communication hole, and the first conductive terminal is electrically connected to the first electrode plate.

In a further improvement to the foregoing solution, the insulating wall is further provided with a second communication hole for communication between the accommodating cavity and the external environment of the packaging member; the packaging member further includes a second conductive terminal arranged at the second communication hole, and the second conductive terminal is electrically connected to the second electrode plate.

In a further improvement to the foregoing solution, the insulating wall includes at least two packaging units, and the at least two packaging units are spliced and fixed sequentially along a circumferential direction of the first end cover so that the insulating wall is in a closed ring shape along the circumferential direction.

In a further improvement to the foregoing solution, at a joint of the two adjacent packaging units, an end of one of the packaging units is recessed towards a side facing the accommodating cavity to form a first connection portion, the other one of the packaging units is recessed towards a side facing away from the accommodating cavity to form a second connection portion, and the first connection portion is fixed to a side of the second connection portion facing away from the accommodating cavity.

In a further improvement to the foregoing solution, the interconnected first connection portion and second connection portion are fixed in at least one of the following ways: ultrasonic welding, laser welding, bonding, or hot-pressing laminating.

In a further improvement to the foregoing solution, at least one of the packaging units includes two first connection portions, and at least one of the packaging units includes two second connection portions; and/or at least one of the packaging units includes both one first connection portion and one second connection portion.

In a further improvement to the foregoing solution, a total thickness of the interconnected first connection portion and second connection portion is equal to a thickness of the insulating wall in portions other than the first connection portion and the second connection portion.

In a further improvement to the foregoing solution, the at least two packaging units include a first packaging unit and a second packaging unit; and the first packaging unit is provided with the first communication hole, and the second packaging unit is provided with the second communication hole.

In a further improvement to the foregoing solution, the first packaging unit includes a first packaging layer and a second packaging layer that are stacked and fixed along a radial direction of the accommodating cavity. A face of the first packaging layer facing the second packaging layer is provided with a first groove, and a bottom wall of the first groove is provided with a first through groove running through the first packaging layer. A face of the second packaging layer facing the first packaging layer is provided with a second groove, the second groove opposites to the first groove and has a same cross-section contour as the first groove, and a bottom wall of the second groove is provided with a second through groove running through the second packaging layer. The first communication hole includes the first groove, the first through groove, the second through groove, and the second through groove, and the first conductive terminal matches the first communication hole in shape.

The radial direction of the accommodating cavity refers to a radial direction of a ring formed by the wall through enclosure, namely, a thickness direction of the first packaging unit.

In a further improvement to the foregoing solution, the first conductive terminal and the first packaging unit are integrally formed through injection molding; and/or the second conductive terminal and the second packaging unit are integrally formed through injection molding.

In a further improvement to the foregoing solution, a sealing plug is further included, the first end cover is provided with a through hole communicating with the accommodating cavity, and the sealing plug is fixed to the through hole and seals the through hole.

In a further improvement to the foregoing solution, an outer surface of the wall is provided with protrusions or grooves or anti-skidding lines.

This application has the following advantages.

Compared with button cells currently on the market, the first conductive terminal of the button cell provided by the embodiments of this application is arranged in a wall, not at an end cover, and is electrically connected to a first electrode plate, thereby forming one outer tab of the button cell. That is, provision of this button cell can overcome the current lack of button cells having a tab on a wall, filling the market gap of lacking such button cells. Through the first conductive terminal, the button cell can be conveniently connected to the conductive terminal arranged at a position of an electronic device corresponding to the wall, to adapt to the electronic device having the conductive terminal arranged at a portion corresponding to the wall.

BRIEF DESCRIPTION OF DRAWINGS

One or more embodiments are exemplarily described with reference to the accompanying drawings corresponding thereto. These exemplary descriptions do not constitute a limitation on the embodiments. Elements having same reference numerals in the accompanying drawings are represented as similar elements. Figures in the accompanying drawings do not constitute a proportional limitation unless otherwise stated.

In the drawings.

1. button cell;

100. electrode assembly; 110. first electrode plate; 120. second electrode plate; 130. separator; 200. packaging member; 210. insulating wall; 220. first end cover; 230. second end cover; 240. first conductive terminal; 250. second conductive terminal; 260. sealing plug; 201. accommodating cavity; 202. first communication hole; 203. second communication hole; 2011. first end; 2012. second end; 211. packaging unit; 212. first connection portion; 213. second connection portion; 2111. first packaging unit; 2112. second packaging unit; 21111. first packaging layer; 21112. second packaging layer; 21113. first groove; 21114. first through groove; 21115. second groove; 21116. second through groove; and 221. through hole.

Description

To facilitate understanding of this application, the following describes this application in more detail with reference to the accompanying drawings and specific embodiments. It should be noted that when an element is expressed as being "fixed to"/"fixedly connected to"/"mounted to" another element, the element may be directly on another element, or one or more elements may be present there-between. When an element is expressed as being "connected to" another element, the element may be connected directly to another element, or one or more elements may be present therebetween. The terms "vertical", "horizontal", "left", "right", "inner", "outer", and similar expressions used in this specification are merely for illustrative purposes.

Unless otherwise defined, all technical and scientific terms used in this specification shall have the same meanings as commonly understood by those skilled in the art to which this application belongs. The terms used herein in the specification of this application are only intended to describe specific embodiments, and are not used to limit this application. The term "and/or" used in this specification includes any one or more of listed associated items and all combinations thereof.

In addition, technical features described below and involved in different embodiments of this application may be combined with each other as long as they constitute no conflict with each other.

In this specification, the "mount" includes fixing or restraining an element or apparatus at a specified position or place by welding, screwing, clamping, bonding or the like manners. The element or apparatus may be held stationary at the specified position or place or be movable within a limited range. The element or apparatus may be detachable or non-detachable after being fixed or restrained at the specified position or place, which is not limited in embodiments of this specification.

Figure 1:
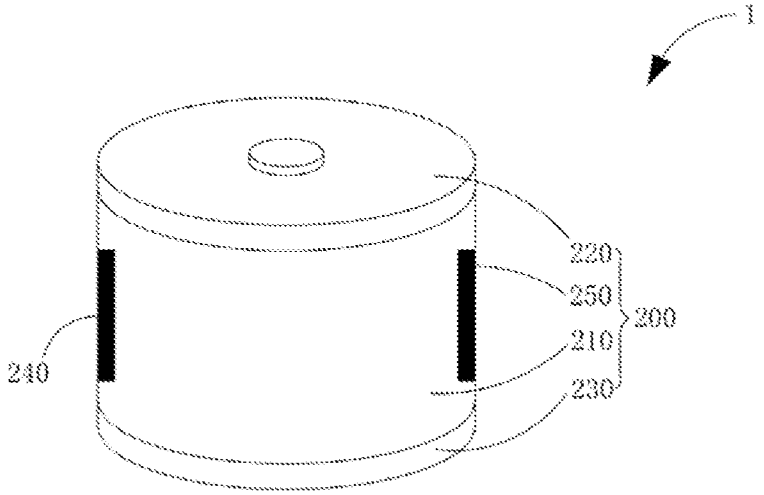
FIG. 1 is a stereoscopic schematic diagram of a button cell viewed from one direction according to an embodiment of this application.
Figure 2:
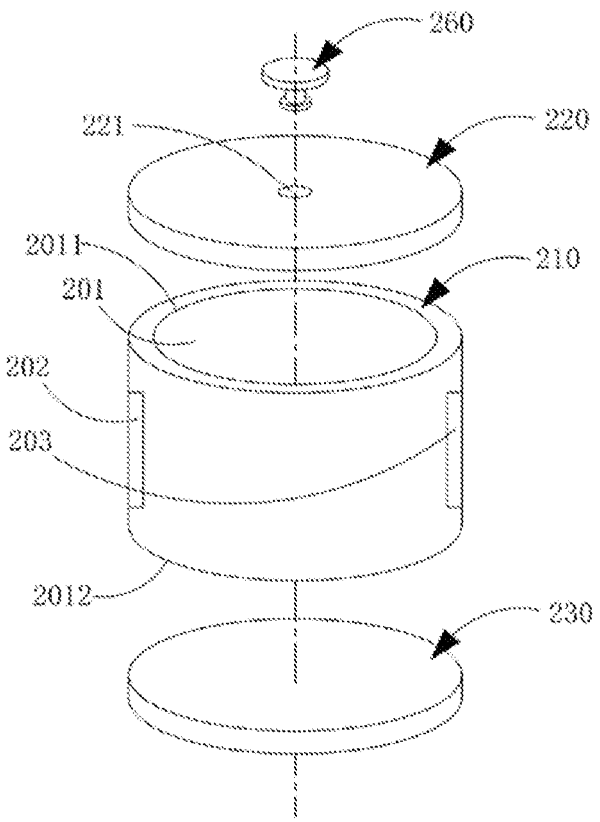
FIG. 2 is a schematic exploded view of a packaging member in FIG. 1.
Figure 3:
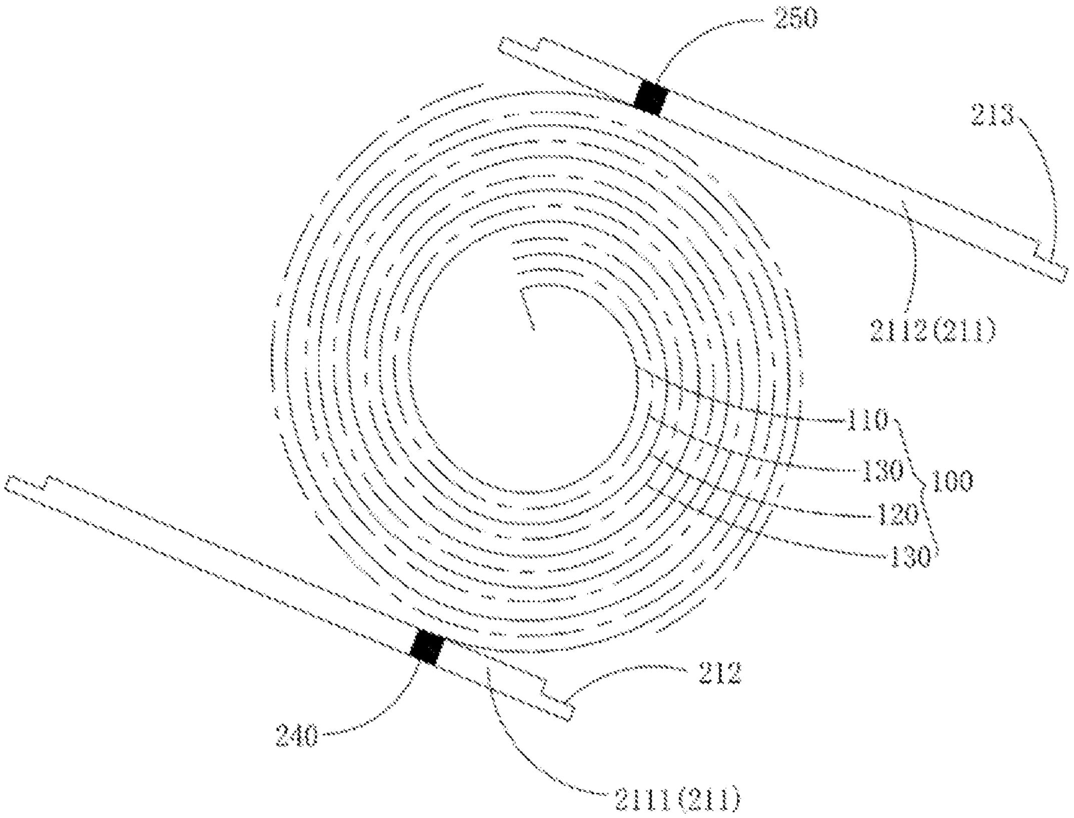
FIG. 3 is a schematic view of connection between a wall of the packaging member in an unfolded state in FIG. 1 and an electrode assembly.

FIG. 1 to FIG. 3 are a stereoscopic schematic view of a button cell 1 provided by an embodiment of this application, a schematic exploded view of a packaging member, and a schematic view of connection between a wall of the packaging member in an expanded state and an electrode assembly, respectively. The button cell 1 includes a packaging member 200, an electrode assembly 100 accommodated in the packaging member 200, and an electrolyte (not shown in the figure) that fills the packaging member. The electrode assembly 100 includes a first electrode plate 110 and a second electrode 120 that have opposite polarities. The packaging member 200 includes a insulating wall 210, a first end cover 220, and a second end cover 230. The insulating wall 210 is an insulator, which encloses an accommodating cavity 201, and the electrode assembly 100 is accommodated in the accommodating cavity 201; and the first end cover 220 covers a first end 2011 of the accommodating cavity 201, and the second end cover 230 covers a second end 2012 of the accommodating cavity 201. The insulating wall 210 is further provided with a first communication hole 202 for communication between the accommodating cavity

201 and an external environment of the packaging member 200. The packaging member 200 further includes a first conductive terminal 240 arranged at the first communication hole 202, and the first conductive terminal 240 is electrically connected to the first electrode plate 110, to form an outer tab of the button cell 1.

For the electrode assembly 100, refer to FIG. 3. The electrode assembly 100 is wound into a cylindrical or elliptic cylindrical structure, which includes the first electrode plate 110, a separator 130, the second electrode plate 120, and another separator 130 which are alternately disposed. The first electrode plate 110 and the second electrode 120 have opposite polarities.

For the packaging member 200, refer to FIG. 2 and FIG. 3. The packaging member 200 includes the insulating wall 210, the first end cover 220, the second end cover 230, and the first conductive terminal 240. The insulating wall 210 is of a tubular structure made of an insulating material, which encloses a through accommodating cavity 201, where the accommodating cavity 201 has the first end 2011 and the second end 2012 that are opposite each other. Both the first end cover 220 and the second end cover 230 are of a flat cylindrical structure; the first end cover 220 covers the first end 2011 of the accommodating cavity and is fixed to the insulating wall 210; and the second end cover 230 covers the second end 2012 of the accommodating cavity 201 and is fixed to the insulating wall 210, thereby sealing two ends of the accommodating cavity 201. Preferably, the insulating wall 210, the first end cover 220, and the second end cover 230 are made of materials having same or similar thermal expansion rates, to ensure that the insulating wall 210, the first end cover 220, and the second end cover 230 have same shrinkage or swelling rates in a temperature-changing environment. The insulating wall 210 is further provided with the first communication hole 202 for communication between the accommodating cavity 201 and the external environment of the packaging member 200, and the first conductive terminal 240 is arranged at the first communication hole 202 and is fixed to the insulating wall 210. The first conductive terminal 240 is made of a conductive material, such as copper, nickel, stainless steel, or aluminum. The first conductive terminal 240 is electrically connected to the first electrode plate 110, thereby forming one outer tab of the button cell 1 to allow for connection to a conductive terminal of an electronic device arranged at a position corresponding to the insulating wall 210. Preferably, a side of the first conductive terminal 240 facing away from the accommodating cavity 201 is flush with an outer surface of the insulating wall 210; and preferably, the first conductive terminal seals the first communication hole 202, to prevent an electrolyte in the accommodating cavity 201 from overflowing through the first communication hole 202.

Further, for ease of filling the accommodating cavity 201 with the electrolyte, the first end cover 220 is provided with a through hole 221 communicating with the accommodating cavity 201, so that staff or an associated device can inject the electrolyte into the accommodating cavity 201 through the through hole 221. Certainly, in order to prevent the electrolyte from overflowing via the through hole 221 during use of the button cell 1, the button cell 1 further includes a sealing plug 260. Specifically, referring to FIG. 2, the sealing plug 260 is fixed to the through hole 221 and seals the through hole 221.

Further, to make the button cell 1 applicable to an electronic device having two conductive terminals arranged at positions corresponding to the insulating wall 210, the insulating wall 210 is further provided with a second communication hole 203 for communication between the accommodating cavity 201 and the external environment of the packaging member 200, and the packaging member 200 further includes a second conductive terminal 250 arranged at the second communication hole 203. The second conductive terminal 250 is made of an electrically conductive material, such as copper, nickel, stainless steel, or aluminum. The second conductive terminal 250 is electrically connected to the second electrode plate 120, thereby forming another outer tab of the button cell. In this way, the button cell 1 can be adaptively connected to two terminals of an electronic device by using the first conductive terminal 240 and the second conductive terminal 250, thereby achieving the above purposes. Preferably, a side of the second conductive terminal 250 facing away from the accommodating cavity 201 is flush with an outer surface of the insulating wall 210; and preferably, the second conductive terminal seals the second communication hole 203, to prevent an electrolyte in the accommodating cavity 201 from overflowing through the second communication hole 203.

In order to prevent the first conductive terminal 240 and the second conductive terminal 250 from separating from the corresponding conductive terminals due to auto-rotation of the butter cell after the button cell 1 is mounted to a matching electronic device, the button cell 1 is further improved in this application. Specifically, an outer surface of the insulating wall 210 is provided with protrusions, and correspondingly, the electronic device is provided with grooves matching the protrusions. The protrusions are used for insertion into the grooves to fix the button cell 1 along its circumferential direction, to overcome the drawback that the first conductive terminal 240 (and/or the second conductive terminal 250) separates from the corresponding conductive terminal(s). It can be understood that in other embodiments of this application, it may be that the insulating wall 210 is provided with grooves, and correspondingly, the electronic device is provided with protrusions that match the grooves. In addition, the outer surface of the insulating wall 210 may also be provided with anti-skidding lines to increase frictional resistance between the wall and the electronic device, thereby improving stability of the button cell 1 in a mounted state.

Referring specifically to FIG. 3 in combination with other accompanying drawings, in this embodiment, the insulating wall 210 includes at least two packaging units 211, each packaging unit 211 is of a curved arc sheet or plate structure, the at least two packaging units 211 are sequentially spliced and fixed along a circumferential direction (namely, an extension direction of a cross-section contour of the first end cover 220 perpendicular to its axis) of the first end cover 220, so that the insulating wall 210 forms a closed ring shape along the circumferential direction. FIG. 3 is a schematic view of the connection between the electrode assembly 100 and the packaging units 211 unfolded straight. At a joint of two adjacent packaging units 211, one packaging unit 211 is recessed towards a side facing the accommodating cavity 201 to form a first connection portion 212, the other packaging unit 211 is recessed towards a side facing away from the accommodating cavity 201 to form a second connection portion 213, and the first connection portion 212 is arranged at a side of the second connection portion 213 facing away from the accommodating cavity 201 and is fixed to the second connection portion. Each of the first connection portion 212 and the second connection portion 213 is thinner than portions of the insulating wall 210 other than the two foregoing connection portions. Preferably, the insulating wall 210 has a uniform thickness, that is, a total thickness of the interconnected first connection portion 212 and second connection portion 213 is equal to a thickness of the insulating wall 210 in other portions. It should be noted that the interconnected first connection portion 212 and second connection portion 213 can be fixed in various ways; they may be fixed in any one of the following ways: ultrasonic welding, laser welding, bonding, or hot-pressing laminating; and certainly, they may be fixed using a combination of more than two of the foregoing ways.

In this embodiment, there are two packaging units 211, where one packaging unit 211 includes two first connection portions 212, and the other packaging unit 211 includes two second connection portions 213, but this application is not limited thereto. For example, in some other embodiments of this application, there are still two packaging units, but each packaging unit 211 includes one first connection portion 212 and one second connection portion 213. In addition, there may be more than three packaging units 211. For ease of description, the following defines a packaging unit 211 including two first connection portions 212 as a first connecting packaging unit, a packaging unit 211 including two second connection portions 213 as a second connecting packaging unit, and a packaging unit including both a first connection portion 212 and a second connection portion 213 as a third connecting packaging unit. Through analysis on a specific structure of each type of packaging unit 211, it can be seen that the numbers of first connection portions 212 and second connection portions 213 included in the insulating wall 210 are definitely the same, while increasing the number of third connecting packaging units will not affect the number balance of the first connection portion 212 and second connection portion 213. Therefore, the insulating wall 210 may only include a third connecting packaging unit, that is, at least one packaging unit 211 includes a first connection portion 212 and a second connection portion 213. Alternatively, the insulating wall 210 may include both first connection packaging units and second connection packaging units, and the number of the first connecting packaging units is equal to the number of the second connecting packaging units, that is, at least one packaging unit includes two first connection portions 212, and at least one packaging unit includes two second connection portions 213. Alternatively, the insulating wall 210 may include first connecting packaging units, second connecting packaging units, and third connecting packaging units, where the number of the first connecting packaging units is equal to the number of the second connecting packaging units, that is, at least one packaging unit includes two first connection portions 212, at least one packaging unit includes two second connection portions 213, and at least one packaging unit includes both a first connection portion 212 and a second connection portion 213.

In this embodiment, the at least two packaging units 211 include a first packaging unit 2111 and a second packaging unit 2112. The first packaging unit 2111 is provided with the first communication hole 202, and the second packaging unit is provided with the second communication hole 203. It should be noted that the first packaging unit 2111 and the second packaging unit 2112 may be in a one-end-to-one-end connection, a two-ends-respectively-to-two-ends connection, or an indirect connection through another packaging unit 211 rather than a direct connection.

Figure 4:
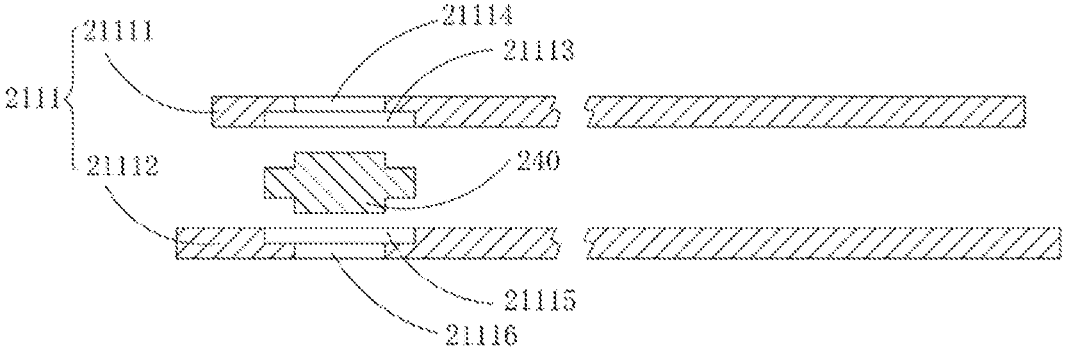
FIG. 4 is a schematic exploded view of a first conductive terminal with a first packaging unit expanded in a horizontal state.

For the first packaging unit 2111, refer to FIG. 4, which is a schematic exploded view of the first packaging unit 2111 unfolded straight and the first conductive terminal 240. The first packaging unit 2111 includes a first packaging layer 21111 and a second packaging layer 21112 that are stacked and fixed along a radial direction of the accommodating cavity 201. Specifically, a side of the first packaging layer 21111 facing the second packaging layer 21112 is provided with a first groove 21113, and a bottom wall of the first groove 21113 is provided with a first through groove 21114 running through the first packaging layer 21111. A face of the second packaging layer 21112 facing the first packaging layer 21111 is provided with a second groove 21115, the second groove 21115 is arranged right facing the first groove 21113 and has a same cross-section contour as the first groove 21113, and a bottom wall of the second groove 21115 is provided with a second through groove 21116 running through the second packaging layer 21112. The first groove 21113, the first through groove 21114, the second groove 21115, and the second through groove 21116 together form the first communication hole. Like a connection way between the first connection portion 212 and the second connection portion 213, the first packaging layer 21111 and the second packaging layer 21112 may be fixed in at least one of the following ways: ultrasonic welding, laser welding, bonding, or hot-pressing laminating. The first conductive terminal 240 is in a “cross” shape matching the shape of the first communication hole 202 and is tightly embedded in the first communication hole 202; a size of the middle portion of the first conductive terminal 240 is greater than a size of two ends of the first communication hole 202, so that there is good sealing performance at the first communication hole 202, preventing an electrolyte in the accommodating cavity 201 from overflowing via the first communication hole 202. Further, in order to ensure that the first conductive terminal 240 is tightly attached to the first packaging layer 21111 and the second packaging layer 21112, roughness of wall surfaces of the first groove, second groove, first through groove, and second through groove may be increased by means of adding protrusions, plasma processing, or the like. Certainly, at each joint of components of the button cell 1, the attaching effect of the connected components may be increased in the foregoing way of increasing surface roughness.

Similarly, a main difference between the second packaging unit 2112 and the first packaging unit 2111 depends on how the first connection portion 212 and the second connection portion 213 are arranged on the two units. Other structures are substantially the same, and the second packaging unit 2112 also includes the first packaging layer 21111 and the second packaging layer 21112; and details are not described herein again.

It should be understood that even if the first packaging unit 2111 in this embodiment includes a first packaging layer 21111 and a second packaging layer 21112 that are arranged in a split manner, and the first conductive terminal 240 is clamped between the first packaging layer 21111 and second packaging layer 21112 of the first packaging unit 2111, and this application is not limited thereto. For example, in other embodiments of this application, the first packaging unit 2111 may be an integrated structure, and specifically, the first conductive terminal 240 and the first packaging unit 2111 are integrally formed through injection molding. Compared with the foregoing implementations, this implementation has a higher production efficiency. Similarly, the second packaging unit 2112 may also be an integrated structure, for example, the second conductive terminal 250 and the second packaging unit 2112 are integrally formed through injection molding.

A button cell 1 provided by an embodiment of this application includes an electrode assembly 100 and a packaging member 200. The packaging member 200 includes a insulating wall 210, a first end cover 220, and a second end cover 230. The insulating insulating wall 210 encloses an accommodating cavity 201, and the electrode assembly 100 is accommodated in the accommodating cavity 201. The first end cover 220 covers a first end of the accommodating cavity 201, and the second end cover 230 covers a second end of the accommodating cavity 201. The insulating wall 210 is further provided with a first communication hole 202 for communication between the accommodating cavity 201 and an external environment of the packaging member 200. The packaging member 200 further includes a first conductive terminal 240 arranged at the first communication hole 202, and the first conductive terminal 240 is electrically connected to a first electrode plate 110 of the electrode assembly 100.

Compared with button cells 1 currently on the market, the first conductive terminal 240 of the button cell 1 provided by this embodiment of this application is arranged on the insulating wall 210, not at an end cover, and the first conductive terminal 240 is electrically connected to the first electrode plate 110, thereby forming an outer tab of the button cell 1. That is, provision of this button cell 1 can overcome the current lack of button cells having a tab on a wall, filling the market gap of lacking such button cells. Through the first conductive terminal 240, the button cell 1 can be conveniently connected to a conductive terminal of an electronic device arranged at a position corresponding to the wall, to adapt to the electronic device having a conductive terminal arranged at a portion corresponding to the wall.

In conclusion, it should be noted that the foregoing embodiments are merely intended for describing the technical solutions of this application, but not for limiting this application; under an idea of this application, the foregoing embodiments or technical features in the different embodiments may be combined, steps may be implemented in any order, many other variations exist in different aspects of this application as discussed above, and for simplicity, they are not provided in detail; although this application is described in detail with reference to the foregoing embodiments, persons of ordinary skill in the art should understand that they may still make modifications to the technical solutions described in the foregoing embodiments or make equivalent replacements to some technical features thereof, while these modifications or replacements do not enable the spirit of the corresponding technical solutions to depart from the scope of the technical solutions of the embodiments of this application.

The invention claimed is:

1. A button cell, comprising:

a packaging member comprising a first end cover, a second end cover and an insulating wall, wherein the insulating wall encloses an accommodating cavity, the first end cover covers a first end of the accommodating cavity, the second end cover covers a second end of the accommodating cavity, and the insulating wall is provided with a first communication hole for communication between the accommodating cavity and an external environment of the packaging member; and an electrode assembly accommodated in the accommodating cavity and comprising a first electrode plate and a second electrode plate having opposite polarities; wherein the packaging member further comprises a first conductive terminal arranged at the first communication hole, and the first conductive terminal is electrically connected to the first electrode plate.

2. The button cell according to claim 1, wherein the insulating wall is further provided with a second communication hole for communication between the accommodating cavity and the external environment of the packaging member; and the packaging member further comprises a second conductive terminal arranged at the second communication hole, and the second conductive terminal is electrically connected to the second electrode plate.

3. The button cell according to claim 2, wherein the insulating wall comprises at least two packaging units, and the at least two packaging units are spliced and fixed sequentially along a circumferential direction of the first end cover so that the insulating wall forms a closed ring shape along the circumferential direction.

4. The button cell according to claim 3, wherein at a joint of two adjacent packaging units, an end of one of the packaging units is recessed towards a side facing the accommodating cavity to form a first connection portion, the other one of the packaging units is recessed towards a side facing away from the accommodating cavity to form a second connection portion, and the first connection portion is fixed to a side of the second connection portion facing away from the accommodating cavity.

5. The button cell according to claim 4, wherein the interconnected first connection portion and second connection portion are fixed in at least one of the following ways:

ultrasonic welding, laser welding, bonding, or hot-pressing laminating.

6. The button cell according to claim 4, wherein at least one of the at least two packaging units comprises two first connection portions, and at least one of the at least two packaging units comprises two second connection portions; and/or at least one of the at least two packaging units comprises both a first connection portion and a second connection portion.

7. The button cell according to claim 4, wherein a total thickness of the interconnected first connection portion and the second connection portion is equal to a thickness of the wall in portions other than the first connection portion and the second connection portion.

8. The button cell according to claim 3, wherein, the at least two packaging units comprise a first packaging unit and a second packaging unit; and the first packaging unit is provided with the first communication hole, and the second packaging unit is provided with the second communication hole.

9. The button cell according to claim 8, wherein the first packaging unit comprises a first packaging layer and a second packaging layer that are stacked and fixed along a radial direction of the accommodating cavity;

a face of the first packaging layer facing the second packaging layer is provided with a first groove, and a bottom wall of the first groove is provided with a first through groove running through the first packaging layer;

a face of the second packaging layer facing the first packaging layer is provided with a second groove, the second groove opposites to the first groove and has a same cross-section contour as the first groove, and a bottom wall of the second groove is provided with a second through groove running through the second packaging layer; and the first communication hole comprises the first groove, the first through groove, the second through groove, and the second through groove, and the first conductive terminal matches the first communication hole in shape.

10. The button cell according to claim 8, wherein the first conductive terminal and the first packaging unit are integrally formed through injection molding; and/or the second conductive terminal and the second packaging unit are integrally formed through injection molding.

11. The button cell according to claim 1, further comprising a sealing plug, wherein the first end cover is provided with a through hole communicating with the accommodating cavity, and the sealing plug is fixed to the through hole and seals the through hole.

12. The button cell according to claim 1, wherein an outer surface of the insulating wall is provided with protrusions or grooves or anti-skidding lines.

* * * * *